(12) United States Patent
Diwane et al.

(10) Patent No.: US 9,124,525 B2
(45) Date of Patent: Sep. 1, 2015

(54) USER-EQUIPMENT-INITIATED FRAMED ROUTES ON CUSTOMER-PREMISES EQUIPMENT FOR WIRELESS WIDE AREA NETWORKS

(71) Applicant: Cisco Technology, Inc., San Jose, CA (US)

(72) Inventors: Shivaji Diwane, Cupertino, CA (US); Ramesh Yeevani-Srinivas, Freemont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 249 days.

(21) Appl. No.: 13/925,169

(22) Filed: Jun. 24, 2013

(65) Prior Publication Data
US 2014/0376559 A1 Dec. 25, 2014

(51) Int. Cl.
*H04L 12/931* (2013.01)
*H04W 76/02* (2009.01)

(52) U.S. Cl.
CPC .............. *H04L 49/35* (2013.01); *H04W 76/02* (2013.01); *H04W 76/022* (2013.01); *H04W 76/027* (2013.01)

(58) Field of Classification Search
None
See application file for complete search history.

(56) References Cited

U.S. PATENT DOCUMENTS

| 2011/0261787 | A1* | 10/2011 | Bachmann et al. | 370/331 |
| 2012/0079113 | A1* | 3/2012 | Zhu et al. | 709/225 |
| 2012/0246325 | A1* | 9/2012 | Pancorbo Marcos et al. | 709/227 |
| 2014/0355536 | A1* | 12/2014 | Muley et al. | 370/329 |

* cited by examiner

*Primary Examiner* — Kodzovi Acolatse
(74) *Attorney, Agent, or Firm* — Patent Capital Group

(57) ABSTRACT

Systems and methods are disclosed for processing framed routes initiated by user equipment (UE) at customer-premises equipment (CPE) and gateways using protocol configuration options (PCO). The PCO can include encoding and decoding framed route information using a PCO information element (IE). The framed route information can include a framed route and a virtual private networking routing and forwarding (VRF) name. The framed route information can also include a tunnel identifier and a packet data protocol (PDP) address. The gateway can include a packet data network gateway (PGW) and a gateway general packet radio service support node (GGSN). When the gateway receives an attach request message from the UE with the encoded PCO, the gateway decodes the PCO to extract the framed route and VRF name, associates a tunnel identifier and PDP address with the extracted framed route and VRF name, and installs the framed route in a corresponding VRF.

17 Claims, 17 Drawing Sheets

| Tunnel ID | PDP address | Associated frame route and VRF |
|---|---|---|
| 1234567 | 172.16.16.16 | 1. 10.10.10.1/24 vrf1<br>2. 11.11.11.1/24 vrf2<br>3. 12.12.12.1/24 vrf3 |

FIG. 6

Attach Accept

```
+-Protocol configuration options ::= TLV OPTIONAL:Exist
  +-Octet1 ::= DIVISION
  | +-Protocol configuration options IEI ::= IEI [27]
  +-Octet2 ::= DIVISION
  | +-Length of protocol config options contents ::= LEN (0..255) [14]
  +-Octet3 ::= DIVISION
  | +-ext ::= EXT1 [1]
  | +-spare ::= FIX [0]
  | +-Configuration protocol ::= CHOICE [PPP for use with IP PDP type]
  +-Octet4-Octet253 ::= DIVISION
    +-protocol config options contents ::= OCTETARRAY SIZE(0..250)
    [80210A0300000A81060A0000001]
```
                                                                    802

FIG. 8

USER-EQUIPMENT-INITIATED FRAMED ROUTES ON CUSTOMER-PREMISES EQUIPMENT FOR WIRELESS WIDE AREA NETWORKS

FIELD OF THE DISCLOSURE

The present disclosure relates generally to systems and methods for providing user-equipment-initiated framed routes in a communications network.

BACKGROUND

Wireless networks are telecommunications networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many applications, including, for example, satellite communications systems, portable digital assistants (PDAs), laptop computers, and mobile devices (e.g., cellular telephones, user equipment). Users of such applications can connect to a network (e.g., the Internet) and also to secure virtual private networks (VPNs). For example, a user can establish a secured VPN connection using a banking application running on a mobile device.

BRIEF DESCRIPTION OF THE DRAWINGS

Various objects, features, and advantages of the present disclosure can be more fully appreciated with reference to the following detailed description when considered in connection with the following drawings, in which like reference numerals identify like elements. The following drawings are for the purpose of illustration only and are not intended to be limiting of the invention, the scope of which is set forth in the claims that follow.

FIG. 6 illustrates example UE-initiated framed routes in accordance with certain embodiments.

FIG. 8 illustrates an example protocol configuration options (PCO) 800 embedded in an attach accept message for UE-initiated framed routes in accordance with certain embodiments.

DESCRIPTION OF EXAMPLE EMBODIMENTS

Overview

Figure 1:
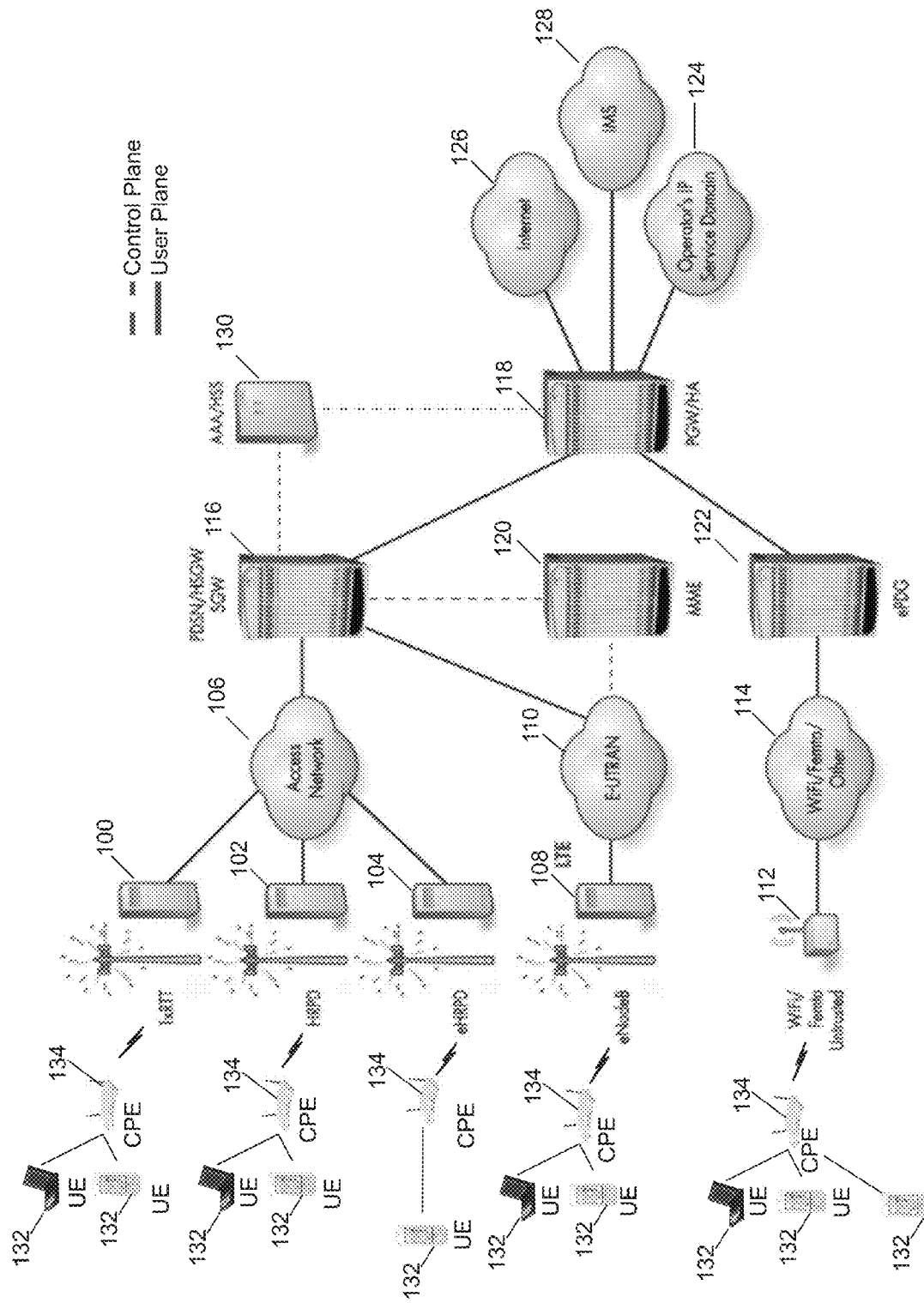
FIG. 1 illustrates a communication network that includes a UE-initiated framed route mechanism in accordance with certain embodiments.

Embodiments of the present disclosure include a method. The method can support framed routes initiated by user equipment. The method can include receiving, at a gateway from a customer-premises equipment (CPE), an attach request message, and extracting at least one framed route and at least one virtual private networking routing and forwarding (VRF) name from a protocol configuration option (PCO) included in the received attach request message. The method can also include associating a tunnel identifier and a packet data protocol (PDP) address with the extracted framed route and the VRF name, and storing the associated tunnel identifier, PDP address, framed route, and VRF name. The method can also include installing the at least one framed route in a corresponding VRF, in response to the received attach request message so that a framed route request initiated by a user equipment (UE) can be supported.

Embodiments of the present disclosure include a customer-premises equipment (CPE). The CPE can support framed routes initiated by user equipment. The CPE can include a memory, an interface, and a processor. The memory can be configured to store framed routes and virtual private networking routing and forwarding (VRF) names. The interface can be configured to receive, from a User Equipment (UE), at least one framed route and at least one virtual private networking routing and forwarding (VRF) name associated with the at least one framed route, the framed route and the VRF name corresponding to a framed routing request capable of being initiated by the UE. The processor can be coupled to the memory and the interface. The CPE can be configured to encode the at least one framed route and the at least one VRF name using a protocol configuration options (PCO), and send, to a gateway, the PCO for installation of the at least one framed route into at least one corresponding VRF.

Example Embodiments

Embodiments of the present disclosure include a user equipment (UE), a customer-premises equipment (CPE) and a gateway configured to support framed routes initiated by user equipment (UE). The present systems and methods allow a CPE to use protocol configuration options (PCO) to leverage framed route information in communication with a PGW. In some embodiments, the present systems and methods can use PCO information elements (IE). In some embodiments, the gateway can be a packet data network gateway (PGW) or a gateway general packet radio service support node (GGSN).

Framed routes allow users or administrators to configure routing information in communications networks, such as cellular or mobile networks. Framed routing allows for dynamically adding static routes to an endpoint so that segments can be accessible without the endpoint needing to support a dynamic routing protocol. The segments can be accessible via additional Internet protocol (IP) addresses. For example, a framed route can allow a consumer to establish routing information via a secured virtual private network (VPN), such as securely connecting to an intranet created by the consumer's employer, or securely connecting to an internal network of a financial institution. Customer-premises equipment (CPE) refers to equipment located at premises of a subscriber, which connects with a carrier's telecommunications channel. Examples of CPE can include mobile or cellular routers, switches, residential gateways, fixed mobile convergence products, home networking adapters, Internet access gateways, telephones, and set-top boxes. CPE allows a consumer to access a carrier's services, and distribute the services around a consumer's house, for example using a local area network (LAN). One example of CPE might be a mobile hotspot, which allows a consumer to connect to a carrier's cellular data services, and allows other devices to use the cellular data services. For example, a mobile hotspot can allow a consumer to share a cellular data plan with a laptop over a wireless communication link (Wi-Fi).

FIG. 1 illustrates a communication network that includes a UE-initiated framed route mechanism in accordance with certain embodiments. FIG. 1 includes user equipment (UE) 132 and customer-premises equipment (CPE) 134, in communication with a number of radio access technologies such as a 1 xRTT transceiver 100, a high-rate packet data (HRPD) transceiver 102, and an evolved high-rate packet data (eHRPD) transceiver 104. Each of the radio access technologies can connect to an access network 106. An evolved NodeB (eNodeB) transceiver 108 is an LTE network radio network component that connects to an Evolved UMTS Terrestrial Radio Access Network (E-UTRAN) 110. Other radio access technologies such as WiFi, Femto, WiMAX, or any other radio spectrum technology can use transceiver 112 to connect to the network using a broadband or other access network.

The user equipment (UE) 132 can include a mobile phone, a laptop with wireless connectivity, a netbook, a smartphone, or any other wireless device. The customer-premises equipment (CPE) 134 refers to equipment located at premises of a subscriber, which connects with a carrier's telecommunications channel. In some embodiments, the CPE 134 can include mobile or cellular routers, switches, residential gateways, fixed mobile convergence products, home networking adapters, Internet access gateways, telephones, and set-top boxes. The CPE 134 allow a consumer to access a carrier's services, for example using the 1xRTT transceiver 100, the HRPD transceiver 102, the eHRPD transceiver 104, the eNodeB 108, or the WiFi/Femto/WiMax transceiver 112. The CPE 134 can distribute the carrier's services to UEs around a consumer's house, for example using a local area network (LAN). One example of CPE might be a mobile hotspot, which allows a consumer to connect to a carrier's cellular data services, and allows other devices to use the cellular data services. For example, a mobile hotspot can allow a consumer to share a cellular data plan with a laptop over a wireless communication link (Wi-Fi).

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1xRTT 100, the HSGW functionality can be used with HRPD 102 and eHRPD 104, and the SGW functionality can be used with the eNodeB 108. The access gateway 116 can communicate with an anchor gateway 118, which can implement a packet data network gateway (PGW) and a Home Agent (HA) and a mobility management entity (MME) 120. On the access network side, the anchor gateway 118 can also communicate with an evolved packet data gateway (ePDG) 122 which provides connectivity to the WiFi/Femto/other transceiver 112. On the packet core side, the anchor gateway can communicate with the operator's IP service domain 124, the internet 126, and IP multimedia subsystem (IMS) 128. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communications network includes the MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for the UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). As described in further detail later, the PGW can be modified to support UE-initiated framed routes. The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1X and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Non-Access Stratum (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG 122 is responsible for interworking between the EPC and fixed non-3GPP access technologies such as a WiFi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
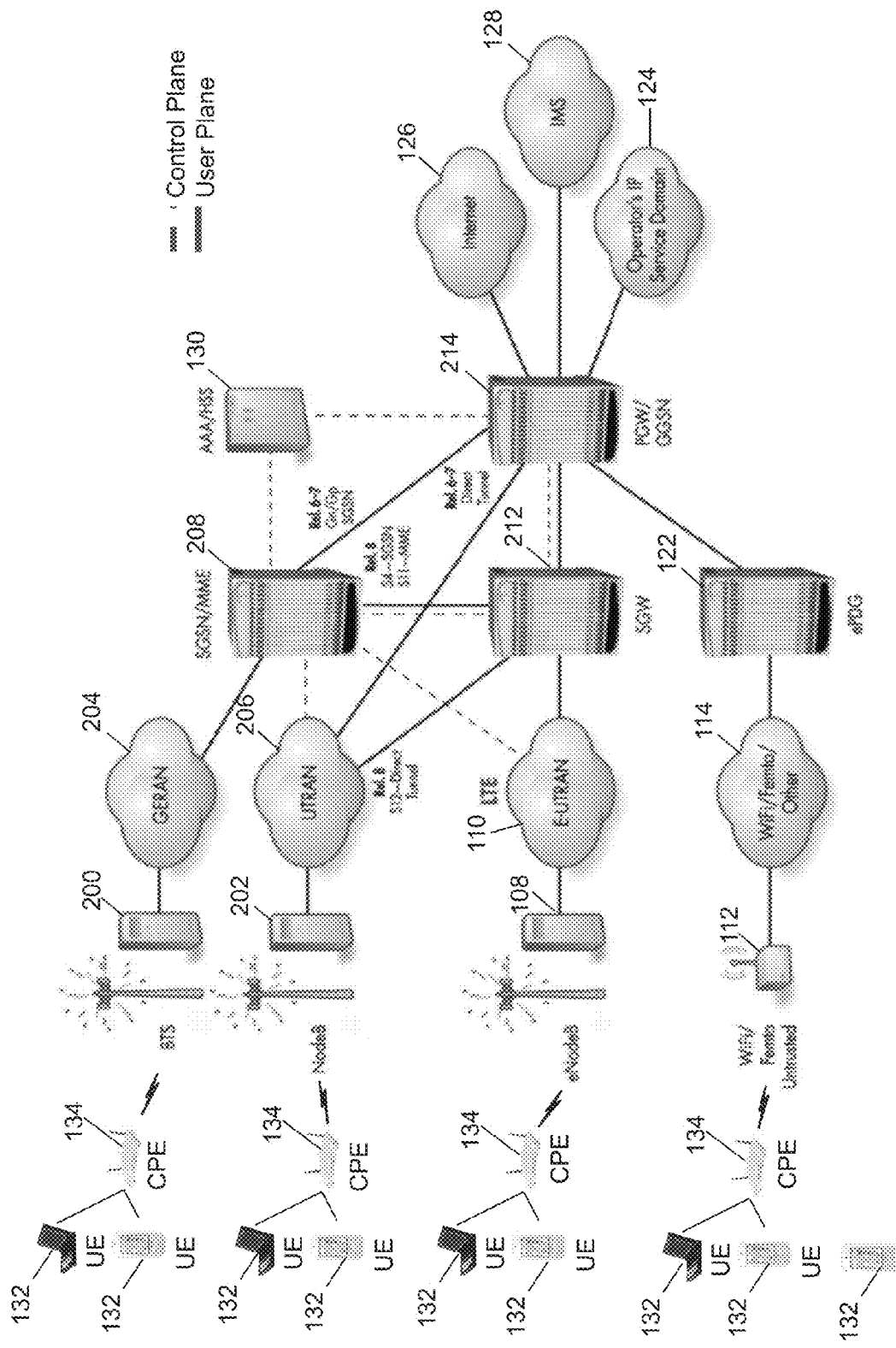
FIG. 2 illustrates a communication network that implements a UE-initiated framed routing mechanism with legacy universal mobile telecommunications systems (UMTS) network devices in accordance with certain embodiments.

FIG. 2 illustrates a communication network that implements a UE-initiated framed routing mechanism with legacy universal mobile telecommunications systems (UMTS) network devices in accordance with certain embodiments. FIG. 2 includes UE 132 and CPE 134 which can communicate with legacy transceivers. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214.

In some embodiments, the UE-initiated framed routing mechanism can be implemented on a gateway, such as the PGW/GGSN 214. The gateway 214 can access and maintain information relating to the communication session, the subscriber, the radio bearers, and the policies relating to the communication session. The gateway 214 may be used to provide various services to a mobile device and implement the quality of service (QoS) on packet flows. Several of these functions are used in providing, for example, voice over IP (VoIP) routing and enhanced services, such as enhanced charging, stateful firewalls, traffic performance optimization (TPO). The communication networks also allow provision of applications such as VoIP, streaming video, streaming music, multi-user gaming, location based services, and a variety of content delivered to a mobile node. Residing within the gateway can be one or more network processing units, line cards, as well as packet and voice processing cards.

Figure 3:
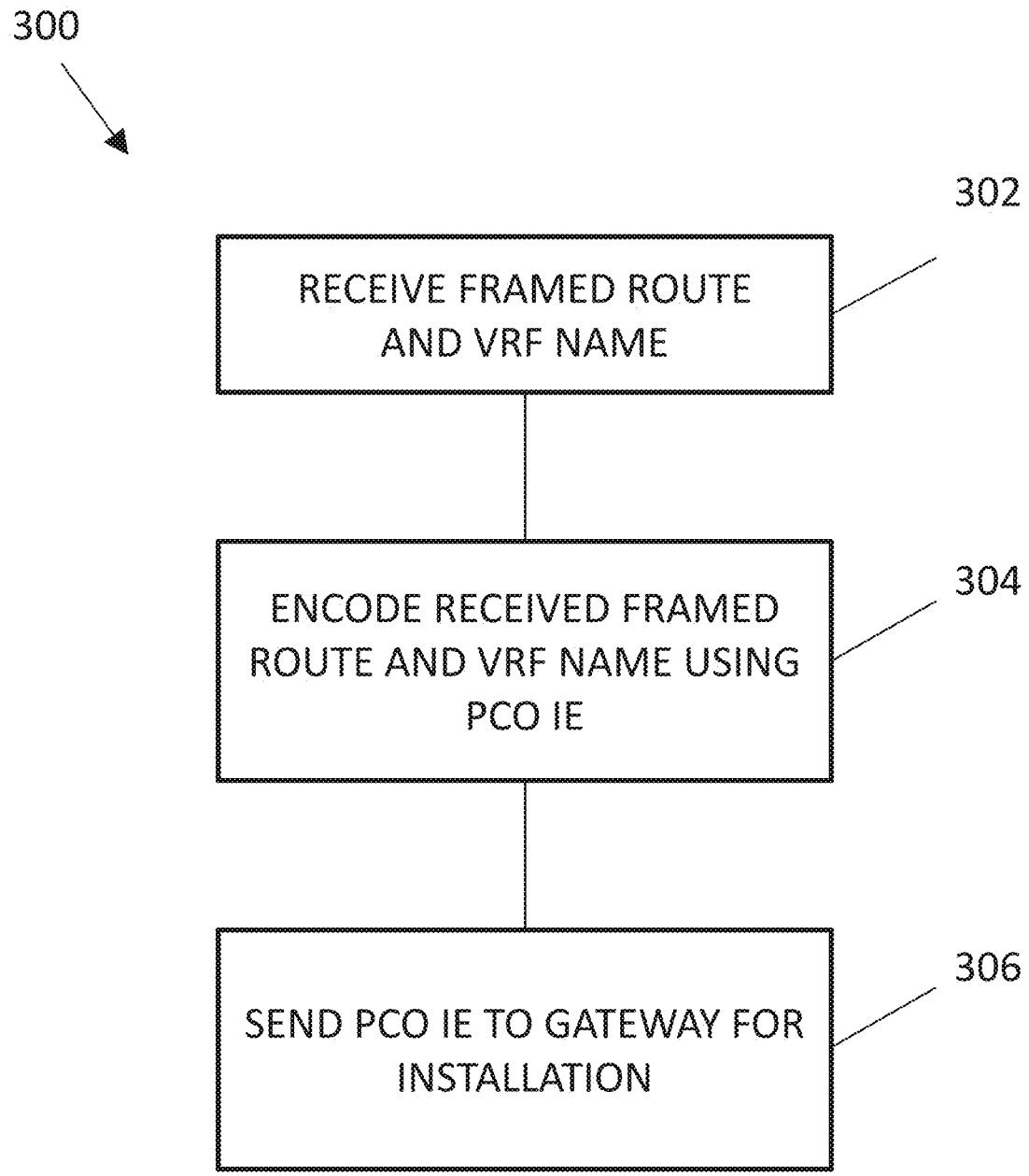
FIG. 3 illustrates a method of processing UE-initiated framed routes using customer-premises equipment (CPE) in accordance with certain embodiments.

FIG. 3 illustrates a method 300 of processing UE-initiated framed routes using customer-premises equipment (CPE) in accordance with certain embodiments. The CPE receives, from a user, a framed route and a virtual private networking routing and forwarding (VRF) name (step 302). For example, a CPE user can input the framed route and VRF name at a command-line interface or a graphical user interface for the CPE. The framed routes can represent secured network connections which a user equipment (UE) may later decide to initiate. The VRF name can be any identifier, such as a string or integer, to help identify and disambiguate the framed routes when a gateway such as a PGW or GGSN later installs the framed routes. The gateway may serve many CPEs and still more UEs. Therefore, the VRF name helps a gateway disambiguate among multiple framed routes that may be installed. In some embodiments, a VRF name also helps a gateway to distinguish between overlapping subnets. For example, a CPE may install two subnets of the same IP address, but with a different VRF name. Accordingly, the same CPE can support overlapping routes using a VRF name.

The CPE encodes the received frame route and VRF name using a Protocol Configuration Option (PCO) (step 304). In some embodiments, the encoding can use a PCO Information Element (IE). Traditionally, PCO is used for sending username and/or password information. PCO IE's are described in Technical Standards (TS) 24.008, 29.060, and 29.274 from the 3rd Generation Partnership Project (3GPP) of the European Telecommunications Standards Institute (ETSI), the contents of each of which are incorporated by reference herein in their entirety. Additional details of PCO use will be described in further detail later, in connection with FIGS. 7-10. The CPE sends the encoded PCO IE to the gateway to install the framed routes (step 306).

In some embodiments, if framed routes are added or deleted after bearer setup, the CPE initiates an update bearer request. The update bearer request carries the change in framed routes from the initial attach message.

Advantageously, the present systems and methods allow a mobile or cellular network to support multiple framed routes and VPNs initiated by one or more users, over the same CPE and gateway. Traditionally, without Network Address Translation or Port Address Translation (NAT/PAT), PGWs and CPE would not allow different VPNs to coexist on the same CPE or Packet Data Protocol (PDP). This is because at the PGW, the source IP address for each end device behind the CPE would always be the same. Traffic segregation was not possible, which meant that a traditional PGW could not apply VRF forwarding. Accordingly, an end device such as a UE was required to use technologies such as NAT or PAT.

Furthermore, the present systems and methods allow each user to have its own source IP address. Traditionally, authentication of every device connected to CPE in the cellular domain was not possible. Traditionally, enterprises with countrywide or nationwide deployments often used centralized authentication servers to control authentication of every individual end device connected to many CPE such as mobile or cellular routers. The present systems and methods allow gateways to authenticate an end device based on its IP address.

Additionally, the present systems and methods allow end users to have freedom in connectivity. Traditionally, a service provider using CPE would have to request a carrier (such as AT&T, Sprint PCS, T-Mobile, or Verizon Wireless) to receive a specialized framed route. The carrier would then be required to configure the framed route in all deployments, and thereafter grant the framed route to the service provider. This traditional process can be lengthy and bug-prone. For example, in all locations in which the carrier did not configure the gateway for a framed route, the service provider may not receive the framed route feature when an end device is roaming.

Figure 4A:
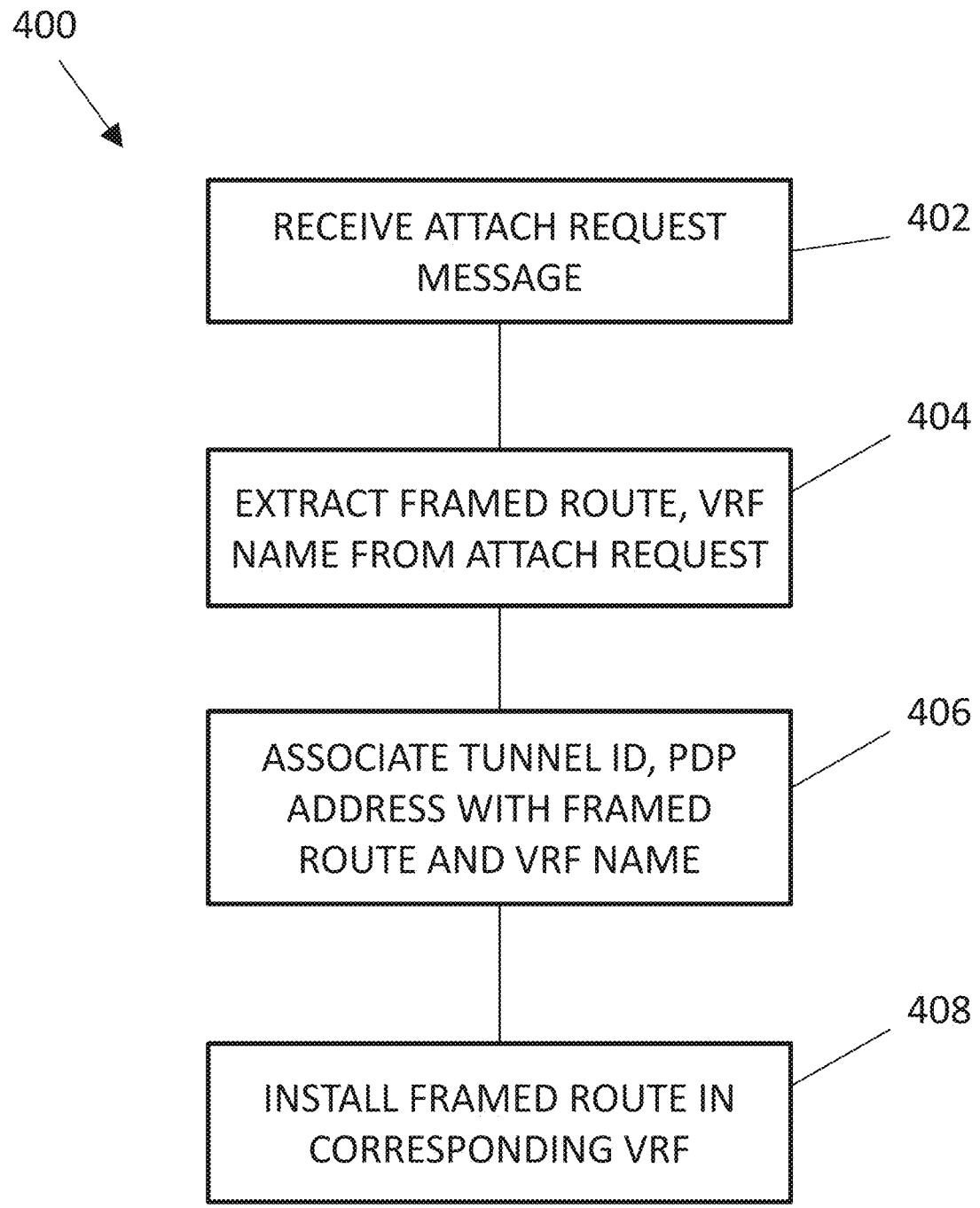
FIGS. 4A-4D illustrate methods of processing UE-initiated framed routes using a gateway in accordance with certain embodiments.

FIGS. 4A-4D illustrate methods of processing UE-initiated framed routes using a gateway in accordance with certain embodiments. FIG. 4A illustrates a method 400 of processing an attach request message for UE-initiated framed routes in accordance with certain embodiments. The gateway receives an attach request message (step 402). For example, a PGW or GGSN can receive an attach request (ATTACH_REQ) message from a UE through the CPE. When a UE or CPE, such as a mobile or cellular modem, initiates an attachment to a network, the CPE automatically sends the ATTACH_REQ message to the PGW. The gateway extracts the framed route and VRF name from the attach request message (step 404). For example, the gateway decodes the PCO IE based on the appropriate container ID carrying the framed route and VRF name. The gateway associates a tunnel ID and packet data protocol (PDP) address with the requested framed route and VRF name (step 406). For example, a tunnel ID can be a tunnel end point identifier (TEID). Data calls (i.e., calls that use packet data protocol (PDP)) can be associated with unique tunnel end point identifier (TEID). A VRF name can be a string or integer which identifies a VRF. A PDP address represents a source IP address from the UE initiating the framed-route request. The gateway installs the framed route in a corresponding VRF (step 408). Accordingly, the gateway is able to map a corresponding framed route to a VRF defined earlier.

Figure 4B:
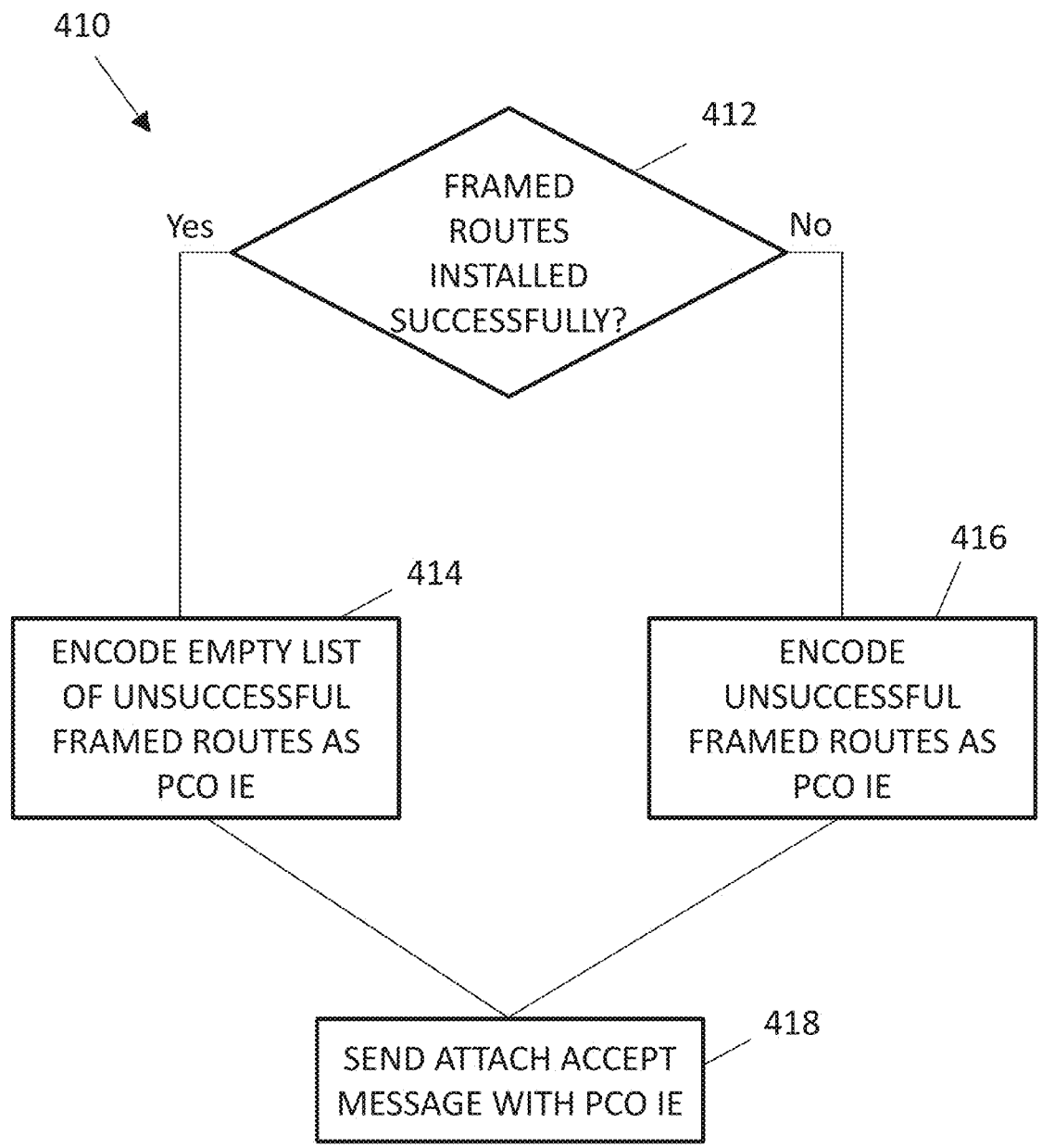

FIG. 4B illustrates a method 410 of sending an attach accept message using a gateway for UE-initiated framed routes in accordance with certain embodiments. The gateway determines whether the framed routes installed properly (step 412). If one or more framed routes did not install properly (step 412: No), the gateway encodes a list of the unsuccessful framed routes using a PCO IE (step 416). If all framed routes installed successfully (step 412: Yes), the gateway encodes an empty list using a PCO IE (step 414). The empty list represents that there are no unsuccessful framed routes. For example, the gateway can encode the list using PCO IE container ID FF01 (shown in FIG. 9). The gateway sends an attach accept message (step 418). The attach accept message can include the encoded PCO IE. The gateway can send the attach accept message back to the CPE, in which the PCO IE indicates success or failure of installing the framed routes.

Figure 4C:
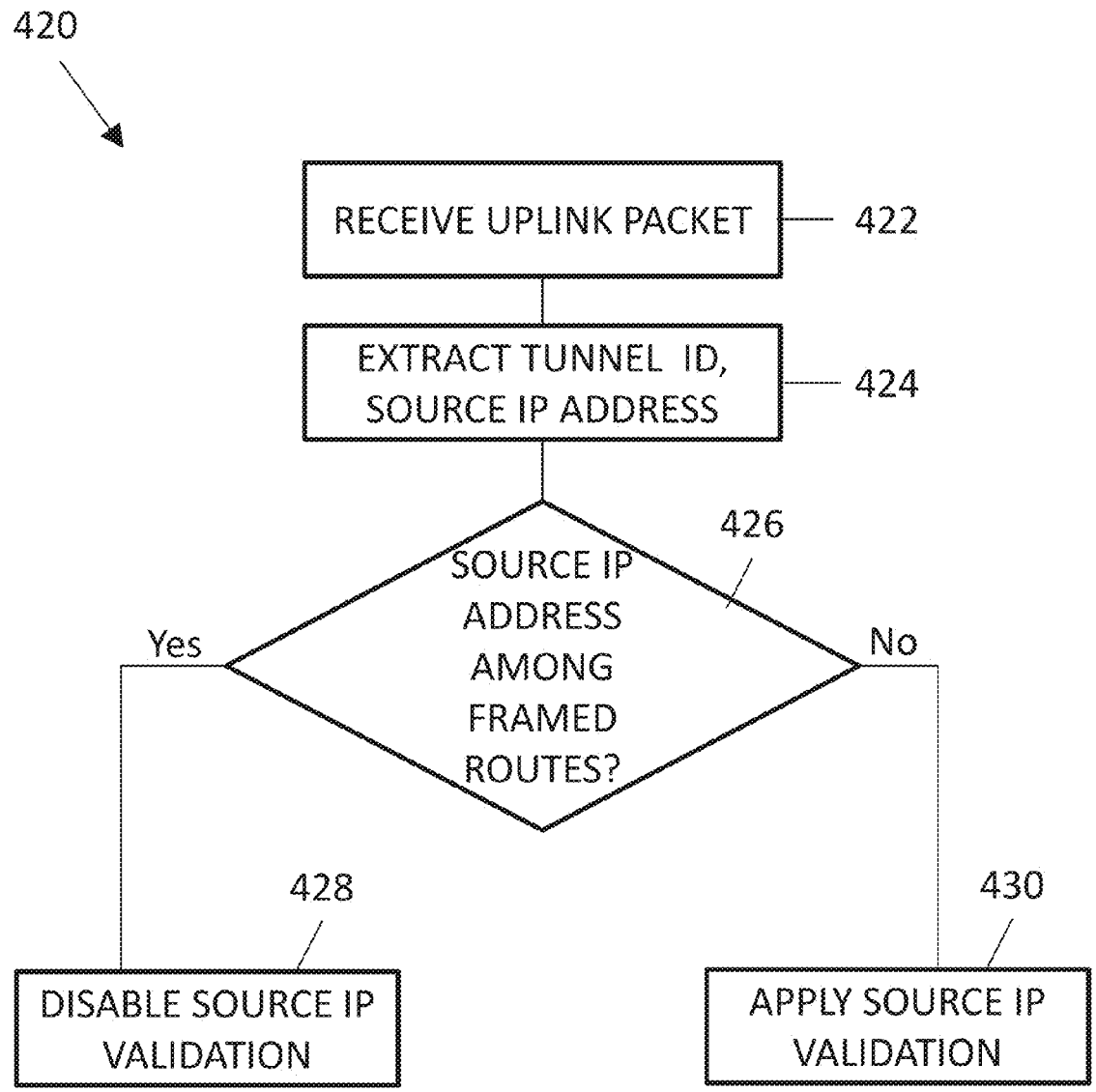

FIG. 4C illustrates a method 420 for processing an uplink data packet using a gateway for UE-initiated framed routes in accordance with certain embodiments. The gateway receives an uplink packet (step 422). An uplink packet refers to a data packet sent from a UE via a CPE, intended for a remote server connected to a network or to the Internet. The gateway extracts a tunnel ID and a source Internet protocol (IP) address from the uplink packet (step 424). The tunnel ID can be a unique key for the gateway to identify a PDP context. The gateway determines whether the source IP address is among the stored list of framed routes (step 426) for a particular tunnel ID (e.g., TEID). For example, the source IP address can be any IP address from the configured VPN, and not the packet data protocol (PDP) address.

If the source IP address is among the framed route (step 426: Yes), the gateway disables its source IP validation check (step 428). Traditionally, the source IP validation check is enabled by default. The source IP validation check determines whether a received packet is suspect or invalid. A packet with an incorrect source IP address can be considered invalid. If so, traditionally the gateway drops the packet and does not deliver the packet to its intended destination. Disabling the source IP validation check allows the uplink packet to reach its intended destination, such as an intranet configured by a financial institution. For example, a gateway can support commands such as "ip source-violation {ignore|check [drop-limit 0 . . . 1,000,000]} [exclude-from-accounting]" and "default ip source-violation." Configuring the command with the "ignore" parameter can disable the source IP validation check. If the source IP address is not among the framed route (step 426: No), the gateway applies its source IP validation rules (step 430). Therefore, the gateway drops the packet if the packet contains an incorrect source IP address, and forwards the packet otherwise.

Figure 4D:
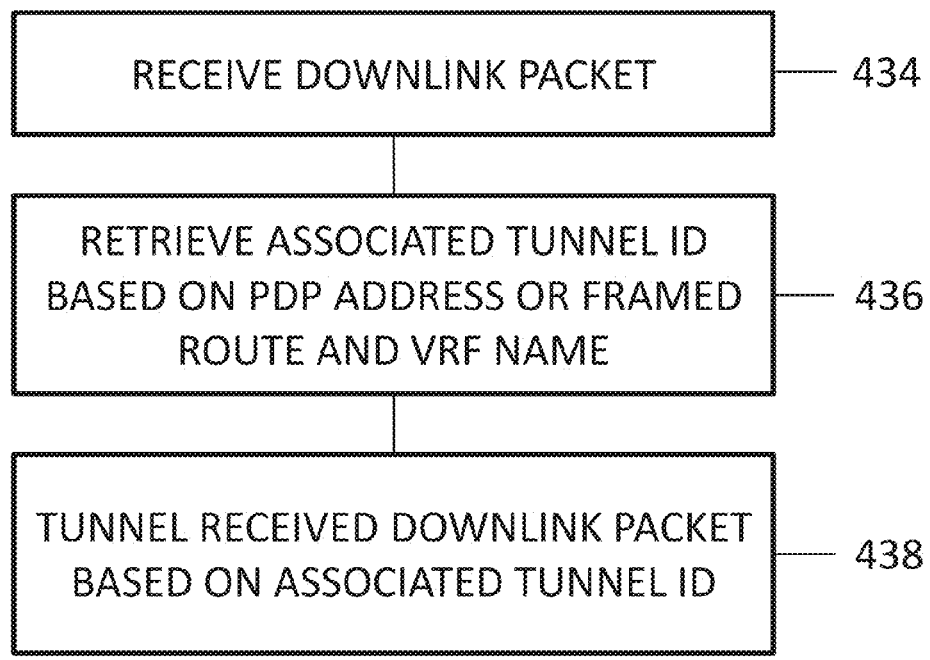

FIG. 4D illustrates a method 432 for processing a downlink data packet using a gateway for UE-initiated framed routes in accordance with certain embodiments. The gateway receives a downlink packet (step 434). A downlink packet refers to a data packet sent from a remote server over a network or the Internet intended for a user equipment (UE). The gateway retrieves an associated tunnel ID for the framed route, based on the packet data protocol (PDP) address of the downlink packet or based on the framed route and virtual private networking routing and forwarding (VRF) name (step 436). The tunnel ID allows the gateway to determine which tunnel should be used for forwarding the downlink packet. The gateway tunnels the downlink packet based on the associated tunnel ID (step 438).

Figure 5A:
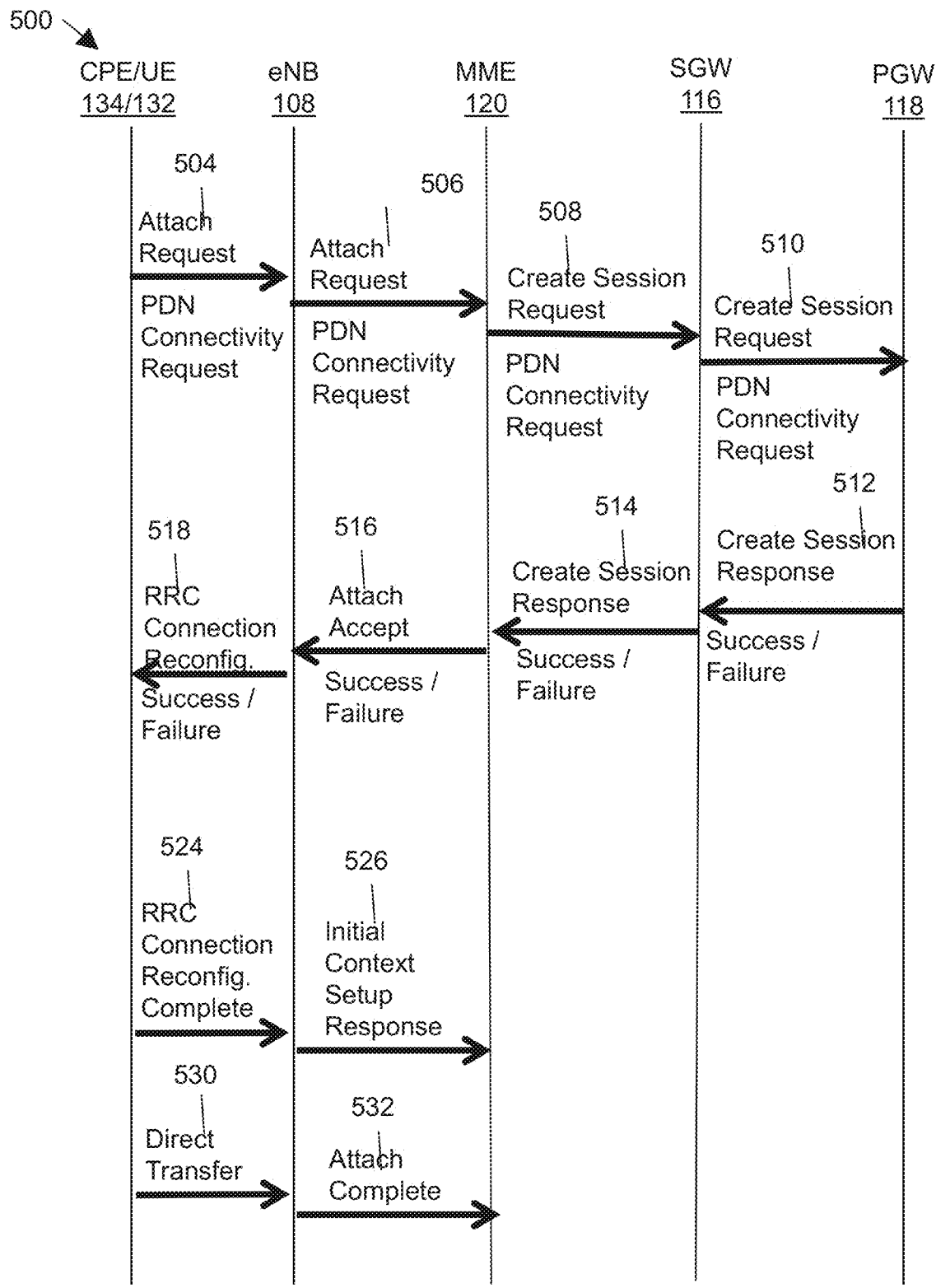
FIGS. 5A-5B illustrate signal flows of messages for processing UE-initiated framed routes in accordance with certain embodiments.
Figure 5B:
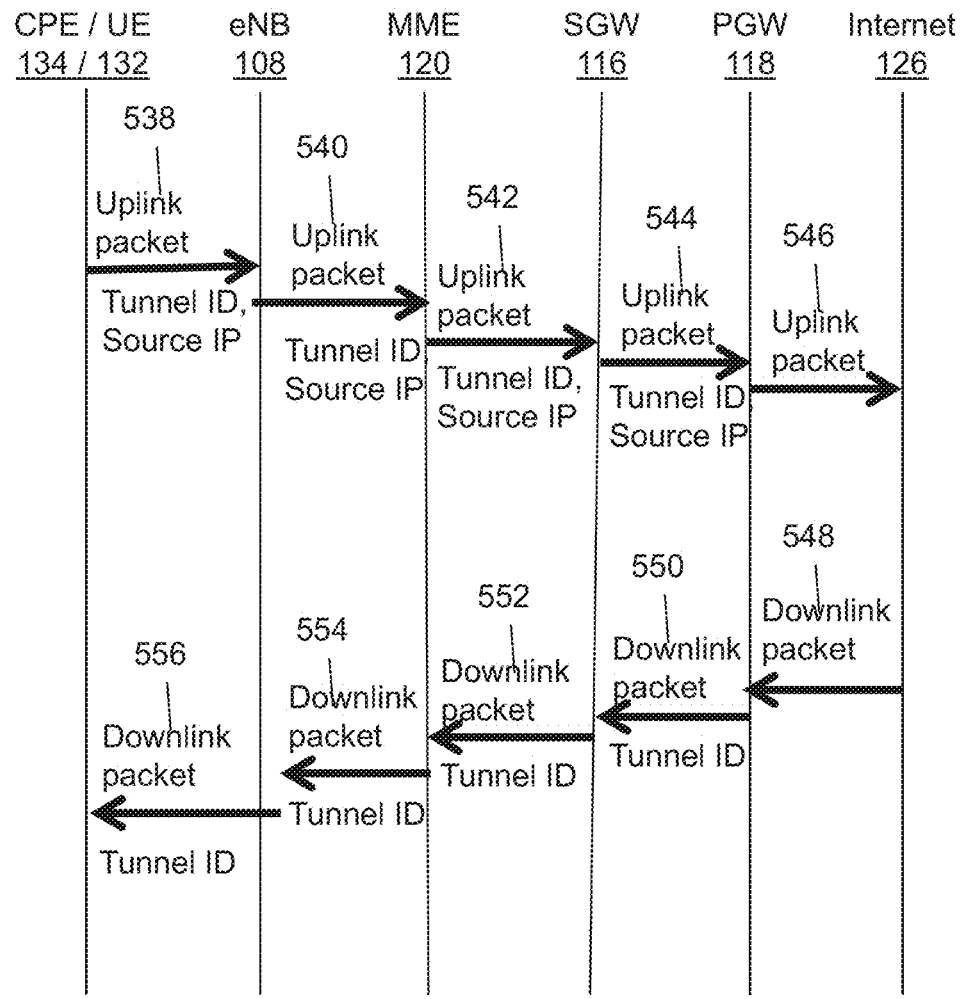

FIGS. 5A-5B illustrate signal flows 500, 534 of messages for processing UE-initiated framed routes in accordance with certain embodiments. FIG. 5A includes messages 504-518, messages 524-526, and messages 530-532, a user equipment (UE) 132, a customer-premises equipment (CPE) 134, an eNodeB 108, a mobility management entity (MME) 120, a serving gateway (SGW) 116, and a packet data network gateway (PGW) 118. A user using the UE 132 can initiate a framed-route request when attaching to the network, by embedding protocol configuration options (PCO) in an attach request message. Details of an attach procedure, such as an E-UTRAN Initial Attach procedure, are described in 3GPP Technical Standard 23.401, the contents of which are incorporated herein by reference in their entirety. Modifications to the traditional attach procedure are described as follows.

The UE 132 and/or the CPE 134 sends message 504, an attach request message, to initiate the Attach procedure. Message 504 contains a message container with an embedded Packet Data Network (PDN) Connectivity Request. The UE 132 and the CPE 134 determine a requested framed route, VRF name and packet data protocol (PDP) address. The UE 132 and the CPE 134 encode the framed route, VRF name, and PDP address into a protocol configuration option (PCO) Information Element (IE) (shown in FIGS. 4, 9-11). The UE 132 and the CPE 134 forward the PCO IE in message 504. In some embodiments, intermediate nodes can forward the message to its destination. Example intermediate nodes can include the eNodeB 108, the MME 120, or the SGW 116.

Advantageously, the use of PCO IE as a transportation mechanism is chosen because PCO IE is transparent to the intermediate nodes. That is, the intermediate nodes relay the PCO IE as-is, from the UE 132 and the CPE 134 to the PGW 118, without modifying the contents. Accordingly, in some embodiments the intermediate nodes such as the eNodeB 108, the MME 120, and the SGW 116 do not need modification to support the present systems and methods. Use of PCO allows the UE-initiated framed routes to be transparent to the access network. In some embodiments, the only needed modifications can be to the UE, CPE, and gateway.

The UE 132 and the CPE 134 transfer the received message as message 504, which contains the embedded PCO and PDN Connectivity Request. The eNodeB 108 receives the message 504, the Attach Request message with embedded PCO IE from the CPE 134. The eNodeB 108 derives the associated MME from the received Attach Request 504, and forwards the Attach Request message 506 to the MME 120. As described earlier, in some embodiments the eNodeB 108 forwards the embedded PCO transparently, and without requiring any modification to the eNodeB. The embedded PCO contains the UE-initiated framed route. The MME 120 selects an SGW for sending a Create Session Request message 508. The MME 120 sends the Create Session Request message 508 to the SGW 116. The Create Session Request message 508 contains the embedded PCO, along with a tunnel identifier such as an MME TEID for the control plane. The SGW 116 sends a Create Session Request message 510 to the PGW 118. The Create Session Request message 510 can contain the embedded PCO, along with a tunnel identifier such as an SGW TEID of the user plane or an SGW TEID of the control plane. The PGW 118 decodes the PCO IE to extract the framed route and VRF name, associates a tunnel ID and Packet Data Protocol (PDP) address with the framed route, and installs the framed route into the corresponding Virtual private networking Routing and Forwarding (VRF) (shown in FIG. 4A).

As an acknowledgement, the PGW 118 returns a Create Session Response message 512 to the SGW 116. The Create Session Response message 512 can include embedded PCO including success or failure information, indicating whether installation of the received framed routes was successful or had errors (shown in FIG. 4B). The Create Session Response message 512 can also include tunnel identifier information such as a PGGW TEID of the control plane or a PGW TEID of the user plane. The SGW 116 returns a Create Session Response message 514 to the MME 120. The Create Session Response message 514 can include embedded PCO, and a tunnel identifier such as an SGW TEID for the user plane or an SGW TEID for the control plane. The MME 120 sends an Attach Accept message 516 to the eNodeB 108. The Attach Accept message 516 can contain embedded PCO and tunnel identifier such as a TEID at the SGW used for the user plane. The Attach Accept message 516 can also be contained in an Initial Context Setup Request message (not shown). The eNodeB 108 sends an RRC Connection Reconfiguration message 518 to the CPE 134 and the UE 132. The RRC Connection Reconfiguration message 518 can include an Attach Accept message (not shown) to be sent to the CPE 134 and along to the UE 132. The RRC Connection Reconfiguration message 518 can include an embedded PCO with UE-initiated framed route information. In some embodiments, the UE 132 or the CPE 134 retrieves the success or failure information from the RRC Connection Reconfiguration message 518, and displays an error or other indicator to a consumer.

The UE 132 and/or the CPE 134 sends an RRC Connection Reconfiguration Complete message 524 to the eNodeB 108.

The eNodeB 108 sends an Initial Context Response message 526 message to the MME 120. The Initial Context Response message 526 contains a tunnel identifier (TEID) of the eNodeB 108, and an address of the eNodeB 108 used for downlink traffic. The UE 132 and the CPE 134 sends a Direct Transfer message 530 to the eNodeB 108. The Direct Transfer message 530 can include an Attach Complete message. The eNodeB 108 forwards the Attach Complete message 532 on to the MME 120. The UE 132 can then send uplink data packets towards the eNodeB 108 which will then be tunneled to the SGW 116 and the PGW 118 using the tunnel identifier.

FIG. 5B illustrates a signal flow 534 of uplink data packets and downlink data packets sent using UE-initiated framed routes in accordance with certain embodiments. FIG. 5B includes messages 538-556, a user equipment (UE) 132, a customer-premises equipment (CPE) 134, an eNodeB 108, a mobility management entity (MME) 120, a serving gateway (SGW) 116, a packet data network gateway (PGW) 118, and an Internet 126. As described earlier, the UE 132 and a remote server (not shown) on the Internet 126 can use a tunnel established during the Attach procedure to exchange data using uplink packets and downlink packets. The UE 132 and the CPE 134 can transmit a message 538, such as an uplink packet, to the eNodeB 108. For example, the UE 132 and the CPE 134 can transmit data over a secured virtual private network (VPN) connection to a remote server such as an intranet. As described earlier, the uplink packet can contain embedded PCO. The message can contain a tunnel identifier and a source IP address. The eNodeB 108 receives the uplink packet and forwards an uplink packet message 540 to the MME 120. The MME 120 receives the uplink packet and forwards an uplink packet message 542 to the SGW 116. The SGW 116 receives the uplink packet and forwards an uplink packet message 544 to the PGW 118. The PGW 118 determines a tunnel ID and a source Internet Protocol (IP) address based on the associated information determined previously (shown in FIGS. 4C, 6). The PGW 118 determines whether to disable source IP validation, and if so, forwards the received message as an uplink message 546 to a remote server (not shown) over the Internet 126.

The remote server (not shown) can transmit a message 548, such as a downlink data packet. For example, the remote server can transmit data over a tunneled VPN connection intended for the CPE 134 and the UE 132. The PGW 118 receives the downlink packet message (perhaps via intermediate nodes), and determines the tunnel identifier based on the Packet Data Protocol (PDP) address or the framed route and VRF name (shown in FIGS. 4D, 6). The PGW 118 tunnels the received downlink packet to the SGW 116 as the downlink packet message 550. The SGW 116 tunnels the received downlink packet to the MME 120 as the downlink packet message 552. The MME 120 tunnels the received downlink packet to the eNodeB 108 as the downlink packet message 554. The eNodeB 108 tunnels the received downlink packet to the appropriate CPE 134 and the appropriate UE 132 as the downlink packet message 556, according to the associated tunnel ID and PDP address (shown in FIG. 6).

FIG. 6 illustrates example UE-initiated framed routes 600 in accordance with certain embodiments. As described earlier, the gateway is configured to decode a protocol configuration options (PCO) information element (IE) containing a framed route and virtual private networking routing and forwarding (VRF) name. For example, the PCO IE might include framed routes 606 "10.10.10.1/24" associated with VRF name "vrf1," "11.11.11.1/24" associated with VRF name "vrf2," and "12.12.12.1/24" associated with VRF name "vrf3." Each framed route can correspond to a different virtual private network (VPN). The notation used above indicates that the first frame route can have 24 bits for address space, and 32−24=8 bits for host prefixes. In other words, the subnetwork for the first framed route can contain at most $2^8=256$ hosts (or 254 usable hosts) having IP addresses beginning with 10.10.10. The subnetwork for the second framed route can contain at most 256 hosts (or 254 usable hosts) having IP addresses beginning with 11.11.11. The subnetwork for the third framed route can contain at most 256 hosts (or 254 usable hosts) having IP addresses beginning with 12.12.12. The PGW has associated tunnel ID 602 "1234567" and packet data protocol (PDP) address 604 "172.16.16.16" with the framed routes. "172.16.16.16" represents the address associated with the user equipment (UE) initiating the framed-route request.

Figure 7:
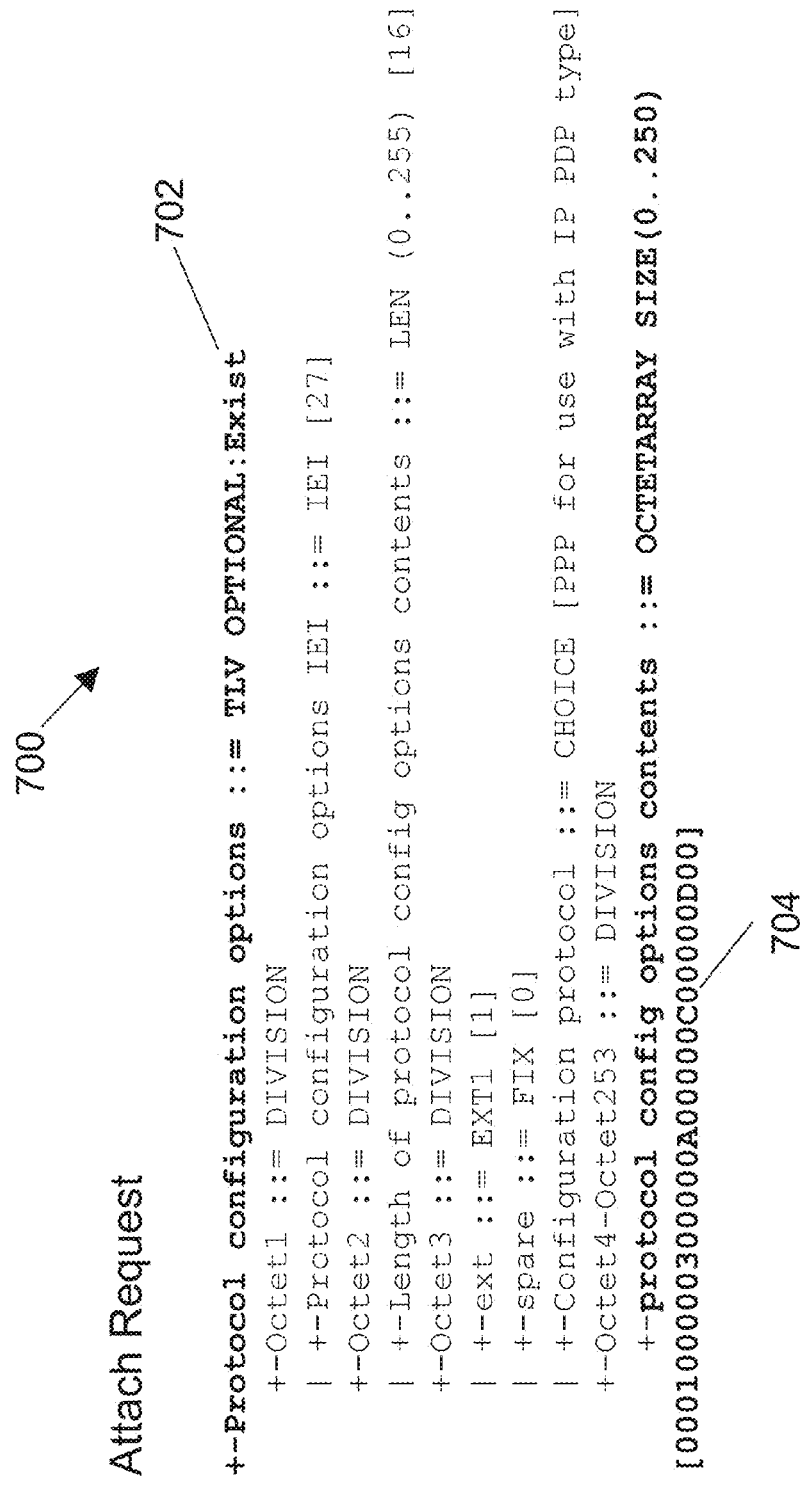
FIG. 7 illustrates an example protocol configuration options (PCO) embedded in an attach request message for UE-initiated framed routes in accordance with certain embodiments.

FIG. 7 illustrates an example protocol configuration options (PCO) 700 embedded in an attach request message for UE-initiated framed routes in accordance with certain embodiments. Embedded in the attach request message can be a protocol configuration option (PCO) Information Element (IE) 702. As described earlier, the CPE can encode, using the PCO IE 700, a received framed route and a virtual private networking Routing and Forwarding (VRF) name. The framed route and VRF name can be stored as PCO IE contents 704. The UE can send the PCO in an attach request message.

FIG. 8 illustrates an example protocol configuration options (PCO) 800 embedded in an attach accept message for UE-initiated framed routes in accordance with certain embodiments. As described earlier, the PGW can send back, in protocol configuration options (PCO) information element 800, an acknowledgement message confirming successful or unsuccessful installation of the UE-initiated framed routes. For example, a list of unsuccessfully installed framed routes can be stored in PCO contents 802. The message 800 can be sent, via intermediate nodes, to the customer-premises equipment (CPE) and on to the user equipment (UE).

Figure 9:
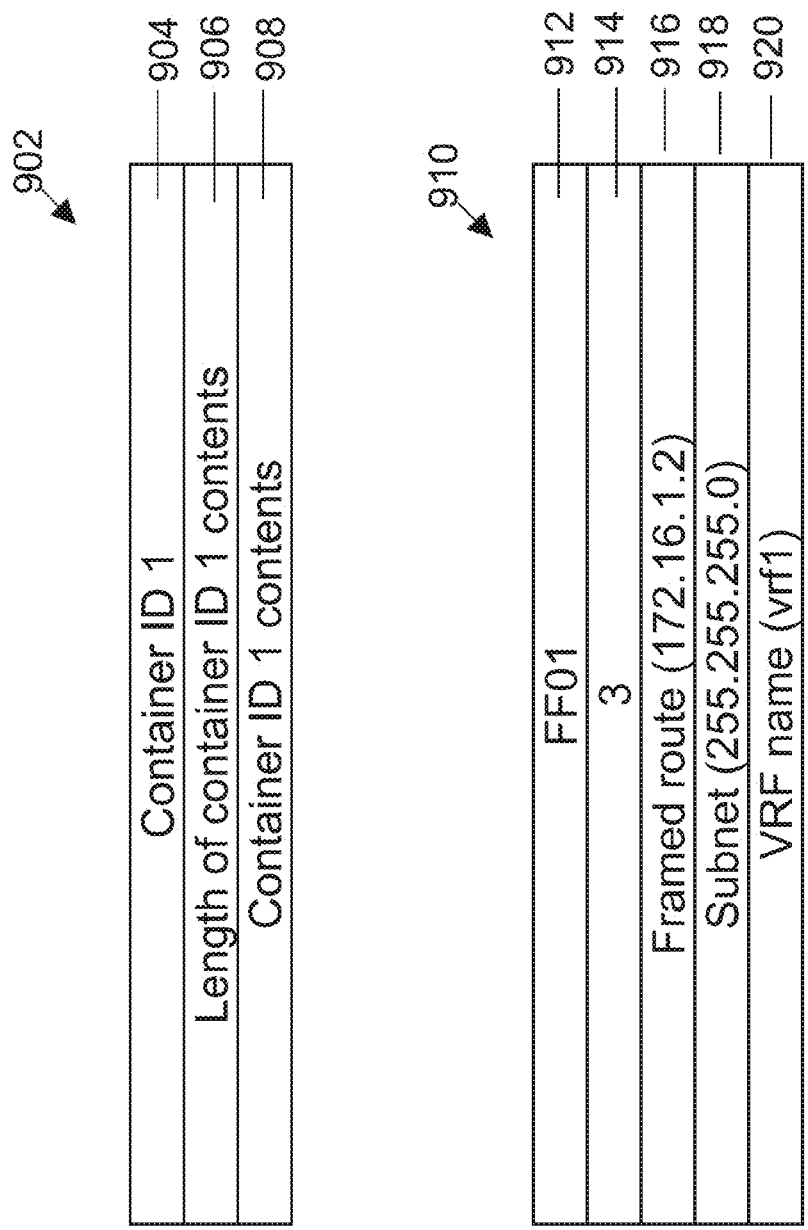
FIG. 9 illustrates example containers for UE-initiated framed routes in accordance with certain embodiments.

FIG. 9 illustrates example containers 902, 910 for UE-initiated framed routes in accordance with certain embodiments. As described earlier, the content of the containers is specified in 3GPP standards TS 24.008, 29.060, and 29.274. The standards describe that certain container IDs 904 are used, and certain container IDs 912 are unused. For example, container ID 1 is used. Container 902 also tracks a length 906 of the container's contents, along with the contents 908 to be stored. Accordingly, the UE, CPE, and PGW can select an unused container ID. In some embodiments, container ID 912 "FF01" can be selected. In further embodiments, any container ID that is unused according to the standard can be chosen. Container IDs above FF00 can be reserved for operator-specific use. The length 914 of contents of the container can be set at least to 3. A length 914 of 3 indicates the PCO container contents will include at least (1) the framed route 916, (2) the subnet 918, and (3) the VRF name 920. In some embodiments, the framed route 916 can be encoded in network bytes (e.g., network bytes representing "172.16.1.2"). Similarly, in some embodiments, the subnet 918 can be encoded in network bytes (e.g., network bytes representing "255.255.255.0"). In some embodiments, the VRF name 920 can be string-encoded (e.g., a string representing "vrf1").

Figure 10:
FIG. 10 illustrates an example packet for UE-initiated framed routes in accordance with certain embodiments.

FIG. 10 illustrates an example packet 1000 for UE-initiated framed routes in accordance with certain embodiments. As illustrated in FIGS. 7-8, a protocol configuration options (PCO) IEI 1002 can be set to IEI. A length 1004 of PCO contents can be set from 0 to 255. A configuration protocol 1006 can be set to Point-to-Point Protocol (PPP) for use with the Internet protocol (IP) packet data protocol (PDP) type. A container ID 1008 of FF01 can be used. In some embodiments, any unused container ID can be used. Container IDs above FF00 can be reserved for operator-specific use. A length 1010 of container contents can be set to the number of pieces of information to be sent in the PCO 1000. As described earlier, this information can include at least a frame route, a subnet, and a VRF name.

User Equipment and Gateway

The user equipment (UE) described above can communicate with a plurality of radio access networks using a plurality of access technologies and with wired communication networks. The user equipment can be a smart phone offering advanced capabilities such as word processing, web browsing, gaming, e-book capabilities, an operating system, and a full keyboard. The user equipment may run an operating system such as Symbian OS, Apple's iOS, Research In Motion's BlackBerry, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable storage medium, flash memory, a magnetic disk drive, an optical drive, a programmable read-only memory (PROM), and/or a read-only memory (ROM). For example, the memory can store the lists of framed routes, virtual private networking routing and forwarding (VRF) names, tunnel identifiers, and packet data protocol (PDP) addresses described earlier. The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

Figure 11:
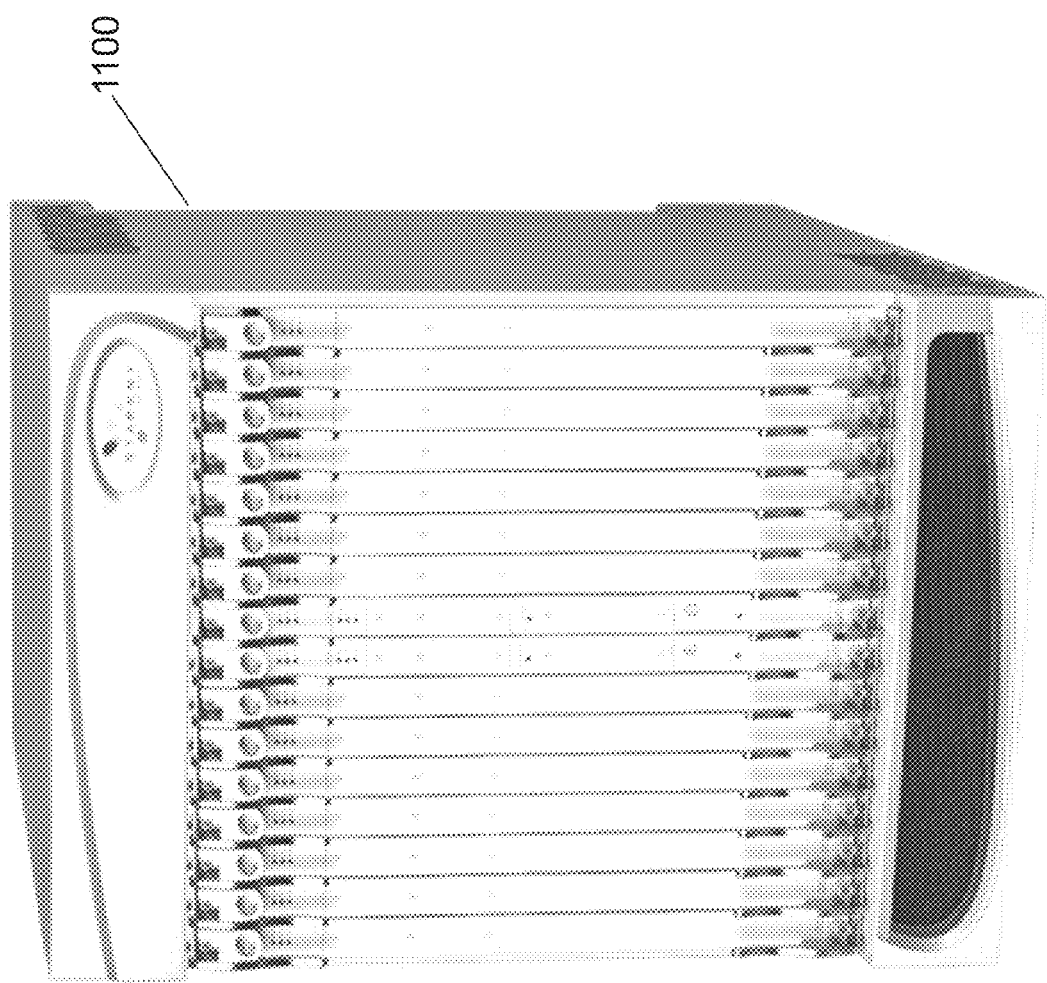
FIG. 11 illustrates a gateway for processing UE-initiated framed routes in accordance with certain embodiments.

FIG. 11 illustrates a gateway 1100 for processing UE-initiated framed routes in accordance with certain embodiments. The UE-initiated framed route gateway 1100 described above is implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In certain embodiments, the functionalities are provided by a combination of hardware and software in the network device. General purpose hardware can be configured in the network device to provide one or more of these specialized functionalities. The gateway 1100 can also support sessions originated from a Femto base station, which would connect to the gateway 1100 using a broadband network. A person or corporation may use a Femto base station in a home or business to support one or more mobile nodes. The gateway 1100 can provide trigger based traffic management during a handoff from a Femto base station to a macro base station, while maintain traffic management for the mobile node. The UE-initiated framed route gateway 1100 can be implemented as any combination of the following including an xGSN, an xGW, an xGW-SGW, and an xGW-PGW.

In some embodiments, the network device is implemented using a collection of integrated circuit boards or cards. These cards include input/output interfaces for communication amongst each other, at least one processor for executing instructions and running modules that are stored in memory, and memory or other storage medium for storing data. For example, the data on the storage medium can include the lists of framed routes, virtual private networking routing and forwarding (VRF) names, tunnel identifiers, and packet data protocol (PDP) addresses described earlier. The features of a network device that implements a gateway, in accordance with some embodiments, are further described below.

Figure 12:
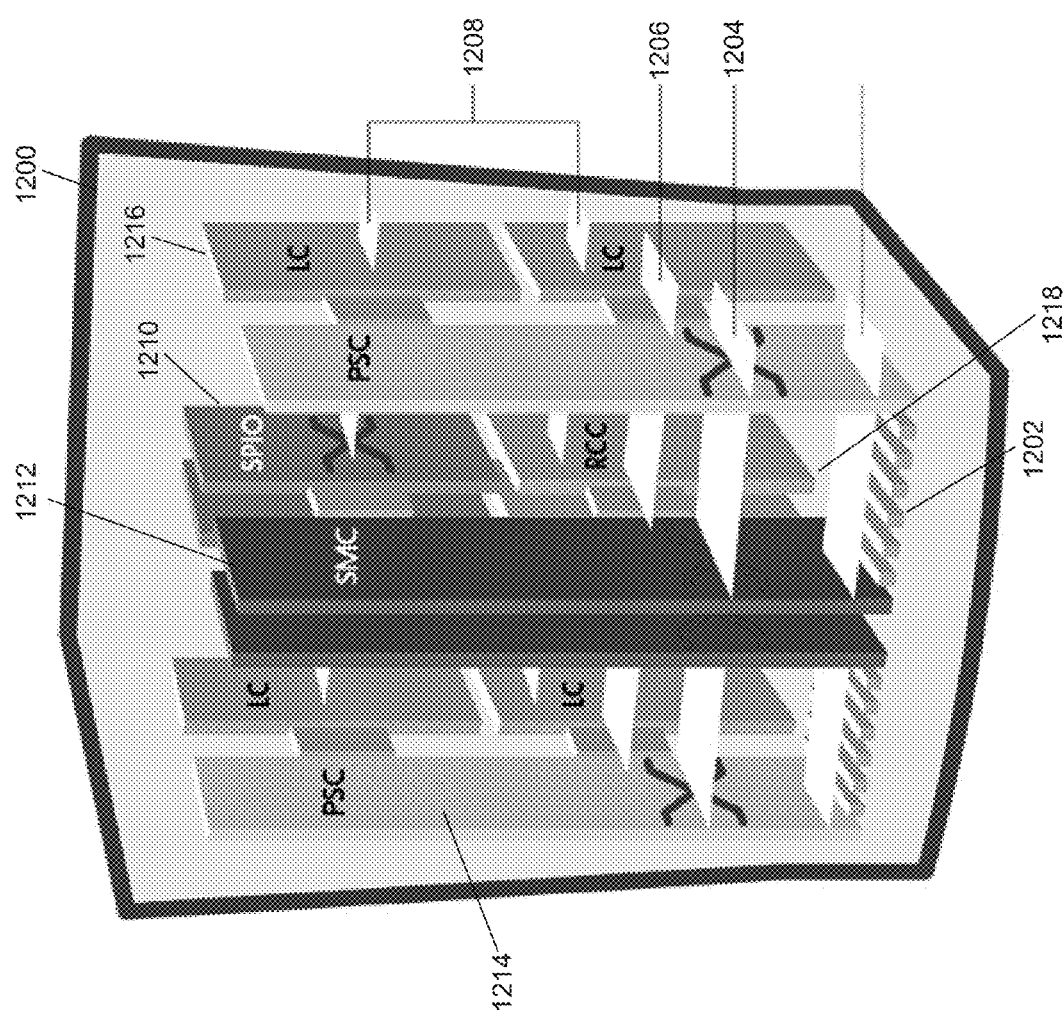
FIG. 12 illustrates an implementation of a network device in accordance with certain embodiments.

FIG. 12 illustrates an implementation of a network device 1200 in accordance with certain embodiments. The network device 1200 includes slots 1202 for loading application cards and line cards. A midplane can be used in the network device to provide intra-network device communications, power connections, and transport paths between the various installed cards. The midplane can include buses such as a switch fabric 1204, a control bus 1206, a system management bus, a redundancy bus 1208, and a time division multiplex (TDM) bus. The switch fabric 1204 is an IP-based transport path for user data throughout the network device implemented by establishing inter-card communications between application cards and line cards. The control bus 1206 interconnects the control and management processors within the network device. The network device management bus provides management of system functions such as supplying power, monitoring temperatures, board status, data path errors, card resets, and other failover features. The redundancy bus 1208 provides transportation of user data and redundancy links in the event of hardware failures. The TDM bus provides support for voice services on the system.

The network device supports at least four types of application cards: a switch processor I/O card (SPIO) 1210, a system management card (SMC) 1212, a packet service card (PSC) 1214, and a packet accelerator card (not shown). Other cards used in the network device include line cards 1216 and redundant crossbar cards (RCC) 1218. The line cards 1216, when loaded in the network device, provide input/output connectivity to the network and other devices, as well as redundancy connections. The line cards 1216 include interfaces to the network through Ethernet, Fiber Optic, and the other communication mediums. The redundant crossbar card (RCC) 1218 includes a non-blocking crossbar and connections to each of the cards in the network device. This allows a redundant connection to be made through the redundant crossbar card 1218 from any one card to any other card in the network device. The SPIO card 1210 serves as a controller of the network device and is responsible for such things as initializing the network device and loading software configurations onto other cards in the network device.

The system management card (SMC) 1212 and switch processor card (not shown) are system control and management cards for managing and controlling other cards in the network device. The packet accelerator card (PAC) and packet service card (PSC) 1214 provide packet processing, context processing capabilities, and forwarding capabilities among other things. The PAC and PSC 1214 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW, PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power.

Figure 13:
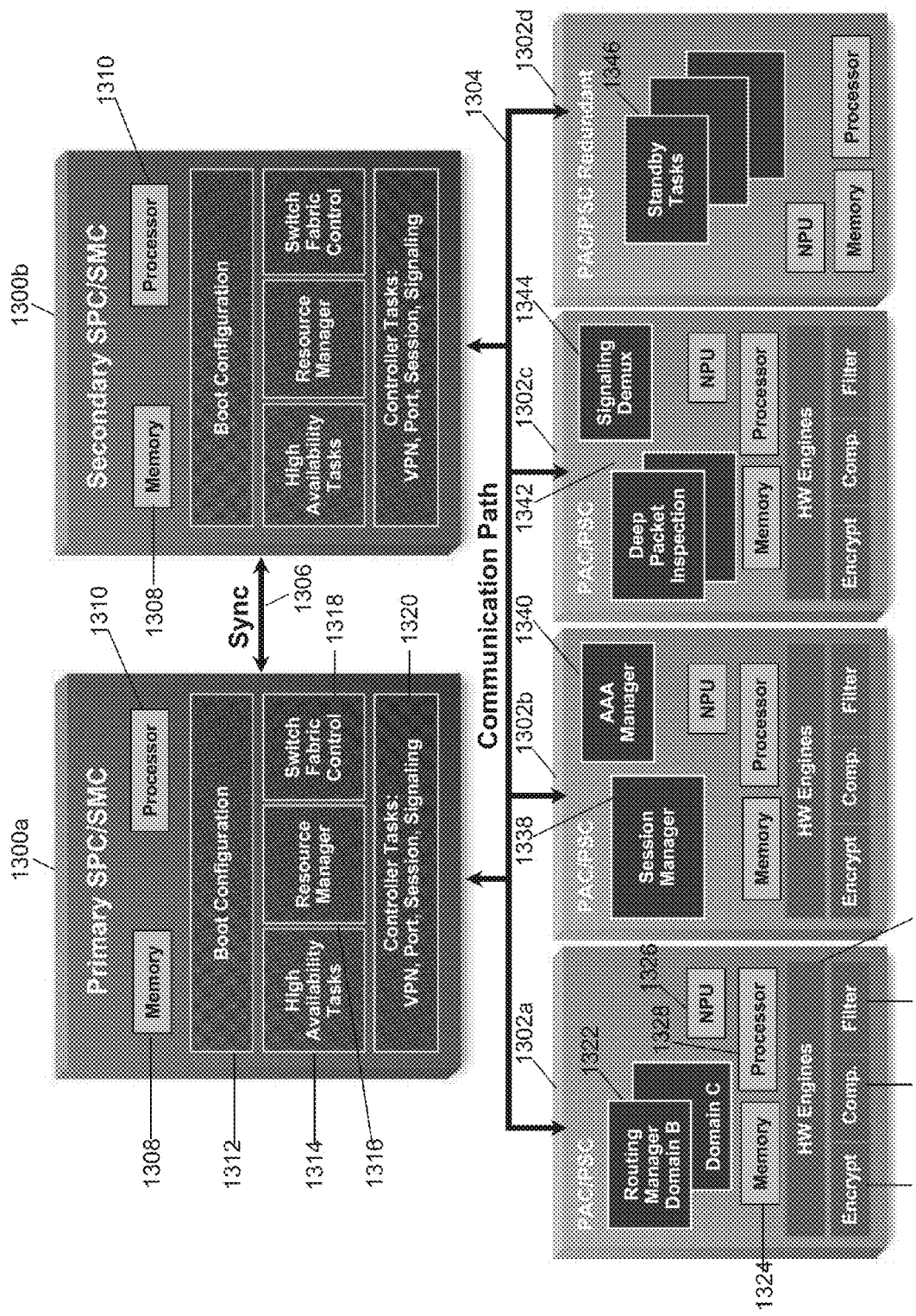
FIG. 13 illustrates a logical view of the software architecture of a network device in accordance with certain embodiments.

FIG. 13 illustrates a logical view of the software architecture of a network device in accordance with certain embodiments. As shown, the software and hardware can be distributed within the network device and across different circuit boards, processors, and memory. FIG. 13 includes a primary switch processor card (SPC)/system management card (SMC) 1300a, a secondary SPC/SMC 1300b, PAC/PSC 1302a-d, a communication path 1304, and a synchronization path 1306. The SPC/SMC 1300 include a memory 1308, a processor 1310, a boot configuration 1312, high availability tasks 1314, resource manager 1316, switch fabric control 1318, and controller tasks 1320.

The SPC/SMC 1300 manage and control the network device including the other cards in the network device. The SPC/SMC 1300 can be configured in a primary and secondary arrangement that provides redundancy and failsafe protection. The modules or tasks running on the SPC/SMC 1300 are related to network device wide control and management. The boot configuration task 1312 includes information for starting up and testing the network device. The network device can also be configured to startup in different configurations and providing different implementations. These can include which functionalities and services are capable of running on the SPC/SMC 1300. The high availability task 1314 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 1300 or a PAC/PSC 1302, while some processor intensive tasks can also be performed across multiple PACs/PSCs to utilize multiple CPU resources. Distribution of these tasks is invisible to the user. The switch fabric control 1318 controls the communication paths in the network device. The controller tasks module 1320 can manage the tasks among the resources of the networks to provide, for example, VPN services, assign ports, and create, delete, and modify sessions for user equipment.

The PAC/PSC 1302 are high-speed processing cards that are designed for packet processing and the tasks involved with providing various network functionalities on the network device. The PAC/PSC 1302 include a memory 1324, a network processing unit (NPU) 1326, a processor 1328, a hardware engine 1330, an encryption component 1332, a compression component 1334, and a filter component 1336. Hardware engines 1330 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 1302 is capable of supporting multiple contexts. The PAC/PSC 1302 are also capable of running a variety of tasks or modules. PAC/PSC 1302*a* provides routing managers 1322 with each covering routing of a different domain. PAC/PSC 1302*b* provides a session manager 1338 and an AAA manager 1340. The session manager 1338 manages one or more sessions that correspond to one or more user equipment. A session allows a user equipment to communicate with the network for voice calls and data. The AAA manager 1340 manages accounting, authentication, and authorization with an AAA server in the network. PAC/PSC 1302 provides a deep packet inspection task 1342 and a signaling demux 1344. The deep packet inspection task 1342 provides inspection of packet information beyond layer 4 for use and analysis by the network device. The signaling demux 1344 can provide scalability of services in combination with other modules. PAC/PSC 1302*d* provides redundancy through standby tasks 1346. Standby tasks 1346 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow.

We claim:

1. A gateway comprising:
   a memory configured to store framed routes, virtual private networking routing and forwarding (VRF) names, tunnel identifiers, and packet data protocol (PDP) addresses;
   an interface configured to receive, from a customer-premises equipment (CPE), an attach request message; and
   a processor coupled to the memory and the interface;
   the gateway, when coupled between a cellular network and a packet data network, being configured to:
   extract at least one framed route and at least one VRF name from a protocol configuration option (PCO) included in the received attach request message;
   associate a tunnel identifier and a PDP address with the extracted framed route and the VRF name;
   store the associated tunnel identifier, PDP address, framed route, and VRF name;
   install the at least one framed route in a corresponding VRF, in response to the received attach request message so that a framed route request initiated by a user equipment (UE) can be supported;
   acknowledge the installation of the at least one framed route requested from the UE;
   encode, using a PCO information element (PCO IE), a list of one or more framed routes that did not install successfully, and send, to the CPE, the PCO IE with the list of one or more unsuccessful framed routes, if at least one framed route was not installed successfully; and
   send, to the CPE, a PCO IE with an empty list of unsuccessful framed routes, if all framed routes installed successfully.

2. The gateway of claim 1,
   the interface further configured to receive, from the CPE, an uplink packet from the UE; and
   the gateway further configured to:
   extract a tunnel identifier and a source Internet Protocol (IP) address from the PCO of the uplink packet;
   disable a source IP validation from testing whether the source IP address is valid, when the source IP address is determined to be among the stored framed routes; and
   apply the source IP validation, when the source IP address is determined not to be among the stored framed routes.

3. The gateway of claim 1,
   the interface further configured to receive, from a remote server over a communications network, a downlink packet intended for the UE; and
   the gateway further configured to
   retrieve the associated tunnel identifier, based at least in part on at least one of the PDP address or the framed route and the VRF name; and
   tunnel, to the CPE and the UE, the received downlink packet based at least in part on the retrieved tunnel identifier.

4. The gateway of claim 1, wherein the gateway configured to extract the at least one framed route and the at least one VRF name includes the gateway further configured to retrieve the at least one framed route and the at least one VRF name from a PCO information element (IE).

5. The gateway of claim 4, wherein the gateway is configured to extract the at least one framed route and the at least one VRF name from a container identifier of FF01 in the PCO IE.

6. The gateway of claim 1, wherein the gateway comprises a packet data network gateway (PGW).

7. The gateway of claim 1, wherein the gateway comprises a gateway general packet radio service support node (GGSN).

8. A method comprising:
   receiving, from a customer-premises equipment (CPE) at a gateway coupled between a cellular network and a packet data network, an attach request message;
   extracting at least one framed route and at least one virtual private networking routing and forwarding (VRF) name from a protocol configuration option (PCO) included in the received attach request message;

associating a tunnel identifier and a packet data protocol (PDP) address with the extracted framed route and the VRF name;

storing the associated tunnel identifier, PDP address, framed route, and VRF name;

installing the at least one framed route in a corresponding VRF, in response to the received attach request message so that a framed route request initiated by a user equipment (UE) can be supported;

acknowledging the installation of the at least one framed route requested from the UE;

encoding, using a PCO information element (PCO IE), a list of one or more framed routes that did not install successfully, and sending, to the CPE, the PCO IE with the list of one or more unsuccessful framed routes, if at least one framed route was not install successfully; and sending, to the CPE, a PCO IE with an empty list of unsuccessful framed routes, if all framed routes installed successfully.

9. The method of claim 8, further comprising:

receiving, from the CPE, an uplink packet from the UE;

extracting a tunnel identifier and a source Internet Protocol (IP) address from the PCO of the uplink packet;

disabling a source IP validation from testing whether the source IP address is valid, when the source IP address is determined to be among the stored framed routes; and applying the source IP validation, when the source IP address is determined not to be among the stored framed routes.

10. The method of claim 8, further comprising:

receiving, from a remote server over a communications network, a downlink packet intended for the UE;

retrieving the associated tunnel identifier from the stored associated tunnel identifiers, PDP addresses, framed routes, and VRF names, based at least in part on at least one of the PDP address or the framed route and the VRF name; and tunneling, to the CPE and the UE, the received downlink packet based at least in part on the retrieved tunnel identifier.

11. The method of claim 8, wherein the extracting the at least one framed route and the at least one VRF name further comprises retrieving the at least one framed route and the at least one VRF name from a PCO information element (IE).

12. The method of claim 11, wherein the extracting the at least one framed route and the at least one VRF name includes retrieving the at least one framed route and the at least one VRF name from a container identifier of FF01 in the PCO IE.

13. The method of claim 8, wherein the gateway comprises a packet data network gateway (PGW).

14. The method of claim 8, wherein the gateway comprises a gateway general packet radio service support node (GGSN).

15. A customer-premises equipment (CPE) comprising:

a memory configured to store framed routes and virtual private networking routing and forwarding (VRF) names;

an interface configured to receive, from a User Equipment (UE), at least one framed route and at least one virtual private networking routing and forwarding (VRF) name associated with the at least one framed route, the framed route and the VRF name corresponding to a framed routing request capable of being initiated by the UE; and a processor coupled to the memory and the interface;

the CPE configured to encode the at least one framed route and the at least one VRF name using a protocol configuration options (PCO); and send, to a gateway coupled between a cellular network and a packet data network, an attach request message including the PCO for installation of the at least one framed route into at least one corresponding VRF;

receive, from the gateway, an acknowledgement of the installation of the at least one framed route requested from the UE in an attach accept message;

wherein the attach accept message comprises a PCO information element (PCO IE) that includes a list of one or more framed routes that did not install successfully if at least one framed route was unsuccessful;

wherein the attach accept message comprises a PCO information element (PCO IE) with an empty list of unsuccessful framed routes, if all framed routes installed successfully; and forward, to the UE, the received attach accept message.

16. The CPE of claim 15, wherein the CPE is further configured to encode the at least one framed route and the at least one VRF name using a PCO information element (IE).

17. The CPE of claim 15, wherein the gateway comprises at least one of a packet data network gateway (PGW) or a gateway general packet radio service support node (GGSN).

* * * * *